United States Patent
Willis

(10) Patent No.: US 7,224,871 B2
(45) Date of Patent: May 29, 2007

(54) ULTRA STABLE OPTICAL ELEMENT X,Y, POSITIONING UNIT FOR USE IN HARSH ENVIRONMENTS

(75) Inventor: Chris L. Willis, Hollis, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 144 days.

(21) Appl. No.: 10/505,597

(22) PCT Filed: Feb. 20, 2003

(86) PCT No.: PCT/US03/05215

§ 371 (c)(1),
(2), (4) Date: Aug. 23, 2004

(87) PCT Pub. No.: WO03/073136

PCT Pub. Date: Sep. 4, 2003

(65) Prior Publication Data

US 2006/0093269 A1    May 4, 2006

(51) Int. Cl.
*G02B 6/26* (2006.01)
(52) U.S. Cl. .......................................... 385/52; 385/137
(58) Field of Classification Search ................. 385/52, 385/137, 147; 269/2
See application file for complete search history.

(56) References Cited

U.S. PATENT DOCUMENTS

| | | | | |
|---|---|---|---|---|
| 4,491,294 A | * | 1/1985 | Blume et al. ............... 248/251 |
| 4,687,287 A | * | 8/1987 | Lukas et al. ................ 385/134 |
| 4,691,586 A | * | 9/1987 | van Leijenhorst et al. ........................ 74/490.09 |
| 4,756,591 A | * | 7/1988 | Fischer et al. ................ 385/88 |
| 6,131,938 A | * | 10/2000 | Speer ......................... 280/506 |

FOREIGN PATENT DOCUMENTS

| DE | 3732566 A1 | * | 4/1988 |
|---|---|---|---|
| EP | 168820 A2 | * | 1/1986 |

* cited by examiner

*Primary Examiner*—Sarah Song
(74) *Attorney, Agent, or Firm*—Robert K. Tendler; Daniel J. Long

(57) ABSTRACT

An X, Y positioning unit, mount or fixture is designed to adjust the position of an optical element mounted in the fixture so as to move it laterally and vertically with respect to the optical axis of the element, such that, once adjusted, the position is maintained through the clamping of plates about the positioning fixture to lock the hinges against movement. In this manner the adjusted position of the optical element is locked in by van der Wall forces exerted by the plates on the fixture, with the locking technique not affecting the alignment. In one embodiment, the fixture includes live hinges which join an optical element holder to a fixed plate and pivot the holder about orthogonal axes crossing at the center of an optical element holder.

11 Claims, 5 Drawing Sheets

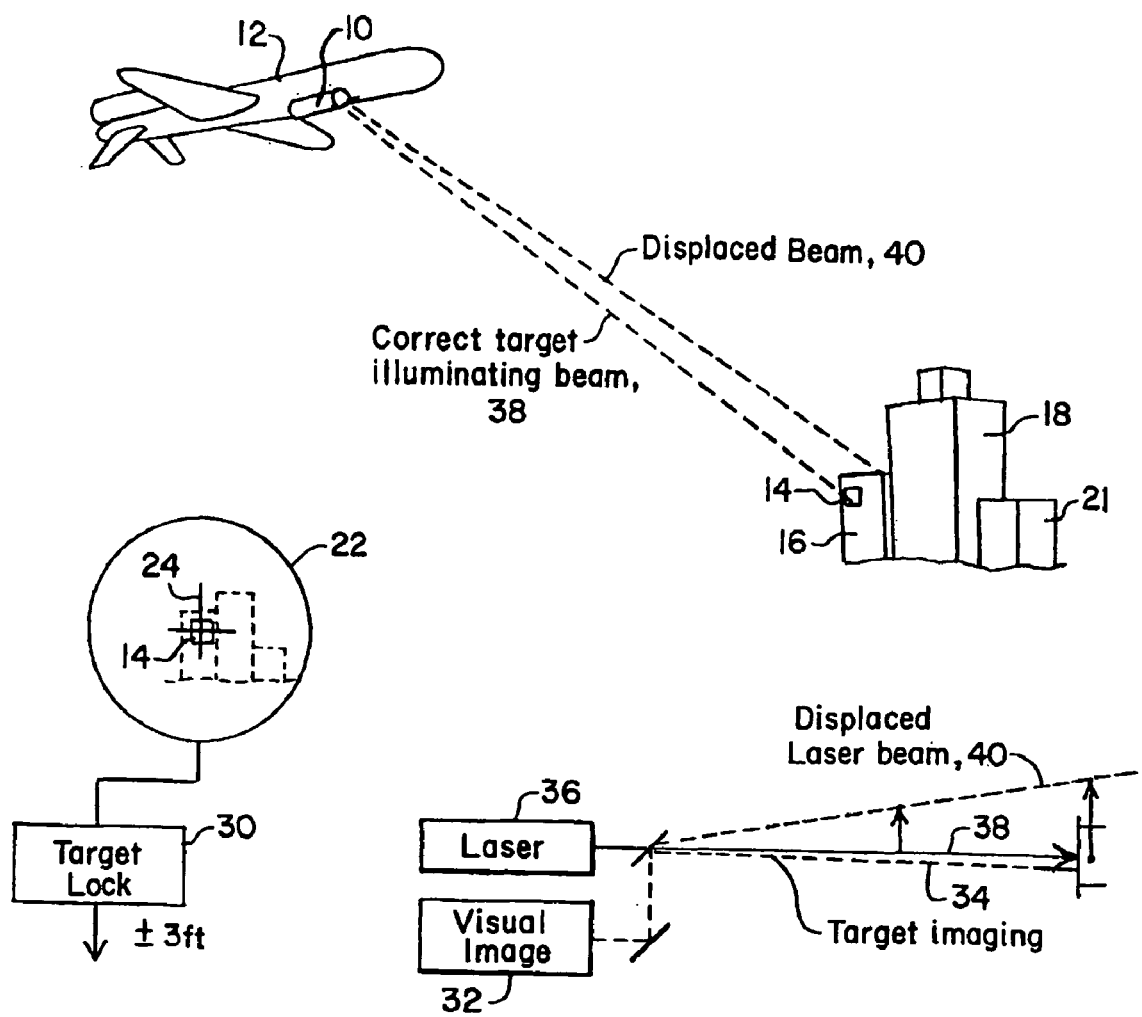
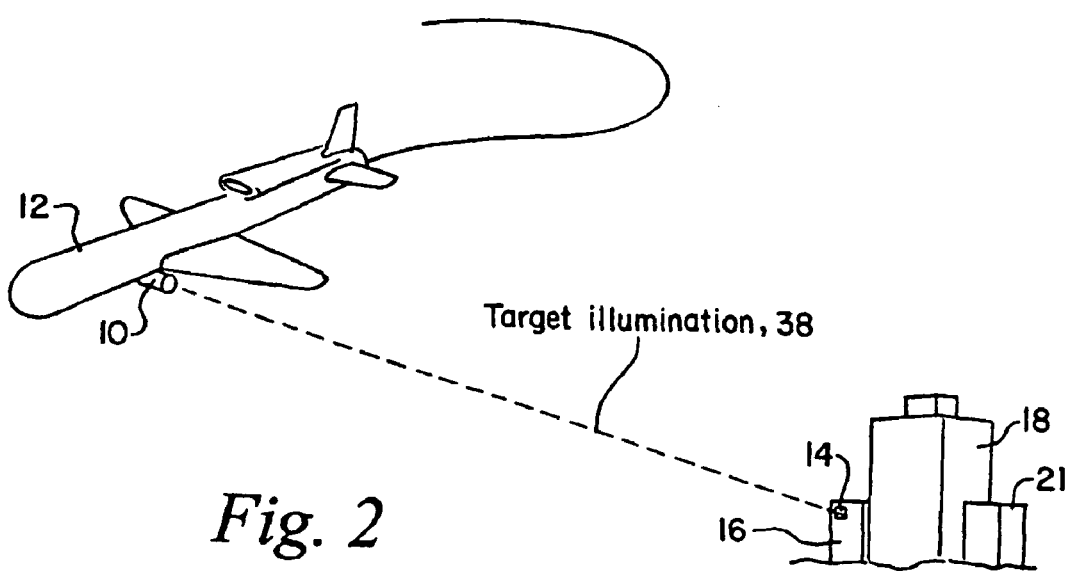
Fig. 1
Fig. 2

ULTRA STABLE OPTICAL ELEMENT X,Y, POSITIONING UNIT FOR USE IN HARSH ENVIRONMENTS

FIELD OF INVENTION

This invention relates to optical alignment equipment and more particularly to a method and apparatus for precisely aligning optical elements and maintaining the alignment in the presence of harsh environments.

BACKGROUND OF THE INVENTION

It will be appreciated that optical alignment systems have included flexible hinge type mechanisms for positioning the optical axis of an optical element through flexure of live hinges. By live hinges, what is meant is a necked-down area on a solid object, being made thin enough that it forms a flexure, allowing one solid portion of the object to move with respect to the solid portion on the opposite side of the necked down region. This movement is pure rotation about the hinge, but for a small angle approximates linear motion. Usually, the elastic limit of the material from which the object is made will allow a few degrees of motion before plastic deformation occurs. Sometimes plastic deformation of the live hinge is allowed, and causes no problem, as long as repeated adjustments are not to be made. The typical deployments of these types of hinges are not particularly well suited for harsh environments because they are usually designed for use in a laboratory, in which the conditions are carefully controlled as to temperature, humidity and mechanical stress. Usually these elements are made up of multiple materials of different thermal coefficients of expansion and generally do not have lock down mechanisms. If they do, the lock down mechanisms deleteriously affect the previously made adjustments. Moreover, laboratory alignment fixtures are not sufficiently robust when used outside the laboratory such as for laser target designators, communications systems involving lasers or in surveying equipment. Additionally, unless ruggedized and specially designed, laboratory fixturing apparatus for the alignment of optical elements is unacceptable for military and commercial applications because optical alignment is severely affected by changing environmental conditions.

For instance, if a laser target designator is mounted on an aircraft, when the aircraft is in the vicinity of a target, the designator is utilized to mark the target by illuminating the target with laser radiation. The way this is usually accomplished is to first obtain a visual image of the target, with the target centered in the crosshairs of a screen. It is then incumbent upon the target acquisition system to be able to position a laser beam exactly along the optical axis that resulted in the visual image. In this manner the visual image is co-boresighted with the laser axis, or visa versa.

In tactical situations, target acquisition requires accuracy of approximately plus or minus three feet in order to be able to accurately direct an ordinance to a particular target. If the laser designated spot is displaced by a significant amount, for instance 20 feet, then the ordinance may miss its target altogether. Thus it is possible that either a tank will not be properly illuminated or that a missile silo can be missed.

In one operating scenario, the aircraft stands off from the target, for instance, one mile and illuminates the appropriate target by providing that the crosshairs on the visual image corresponds to the portion of the target to be illuminated. The plane then executes a high G roll and flies away from the target with the laser target designating equipment tracking the target as the aircraft executes its maneuvers.

It will be appreciated that aside from the system dynamics of the laser target designator, the precision by which the laser is co-boresighted with the optical image depends in large part upon how accurately the system was aligned to begin with. This means, for instance, when using one laser beam to end-pump a small crystal of another laser, such as a designator laser, the pump beam must be accurately focused into the lasing material. If the pump laser is mounted remotely from the designator laser compartment, the output of the pump laser can be transmitted through a fiber optic link and focused on the pump region, typically in a 0.1 millimeter or less wide volume within the laser rod.

This focusing operation is highly critical, with any off centering of the pumped radiation in the laser rod causing a loss of laser power and boresight alignment.

The pump laser is mounted remotely because one does not want to introduce excess waste heat in the region of the designator laser cavity or compartment. The heat generated by the pumping laser is sometimes referred to as self-contamination, which can cause a shift of the optical elements resulting in boresight error.

Typically in such an environment, it is important to be able to accurately position the distal end of the optical fiber relative to a collector lens and a focusing lens assembly so that light from the distal end of the fiber is appropriately focused in the aforementioned pump region of the laser rod. So precise is the positioning requirement for the end of the fiber optic cable that lateral movement of the cable of greater than one half-micron results in reduced laser power, and possibly boresight error, due to movement of the focused radiation, and thus the pump region within the laser rod. For a two-millimeter laser rod, the pump region is typically on the order of 0.1 millimeter in diameter.

Even with the optical fiber termination being appropriately positioned during an alignment procedure, if due to the aforementioned harsh environment lateral positioning errors build up and exceed the one half-micron limit, then the laser beam which creates the laser designator spot can be off by as much as 20 feet at a standoff distance of one mile.

As mentioned, a laser beam displaced by 20 feet can result in a completely missed target or the illumination, sometimes referred to as painting, of an unintended target.

From the point of view of laser target designators, the pointing accuracy of the entire system typically must be less than 0.5 milliradians. While there are indeed many factors in the laser target designation system which can contribute to boresight error, it is incumbent upon the laser itself to contribute as little as possible to this error. The laser, as a component of a designator system may only be allowed as much as 0.2 milliradians of boresight error, and a 10% energy drop over the entire environmental range of changing temperatures, pressures, accelerations, self contamination loading, and acoustics.

Another application that requires the ultimate in boresight accuracy is in the area of countermeasures. In these types of environments an incoming missile is to be countered. This requires firing a modulated laser beam towards the incoming missile with such accuracy that the beam impinges on the missile as it approaches its target. Sometimes the time window for acquisition and beam deployment is less than two seconds. Moreover there must be enough laser power illuminating the missile to counter it. This requires highly accurate aiming, which cannot be deleteriously affected by misalignments of the optical elements on the optical bench.

Such countermeasures require the same alignment accuracies as discussed above, the 0.5 milliradian accuracy.

There are however other applications for an X, Y positioning fixture or unit for optical elements, not the least of which is when one is trying to couple the ends of opposed single mode fibers. A single mode fiber, such as might be used in a fiber optic telecommunications system, is commonly less than ten microns in diameter. Assuming that the two fibers are to be aligned along the same optical axis, one would commonly require having a one half-micron transverse alignment accuracy and stability in order to successfully couple one fiber to the other with less than 0.4 dB splice loss. Certainly, there are other applications where the alignment requirements are even tighter, and where the precision alignment must be maintained in harsh environments involving large temperature swings as well as high dynamic and static loading conditions.

Moreover, for optical communications it is important that the laser source illuminate the intended receiver. When, for instance, providing laser communications between an over flying satellite and an earth station, any positioning errors will affect the receipt of information contained on the beam. Free space laser communications devices are becoming more important in commercial and military applications. To keep communications secure, narrow beam divergences and accurate pointing will be necessary qualities of these systems. In this scenario, as well as those presented above, boresight alignment is critical. In order to achieve the necessary stringent tolerances, the optical elements themselves must be accurately aligned and must maintain their alignment. There is therefore a need for a robust device for achieving alignment and preserving it in harsh environments.

SUMMARY OF THE INVENTION

In order to maintain the original alignment of optical elements, in the subject invention a positioning unit, mount or fixture is utilized in which X, Y centering of the optical element is achieved through the utilization of a unit having two live hinges for controlling the movement of the optical element in two orthogonal directions. The hinges themselves are located along the X and Y axes respectively and involve the utilization of a block of material having slots machined or otherwise provided therein to form thin flexible hinge elements. Setscrew activation or other means of positioning the optical element results in movement of an optical element holder about these two hinges such that in one embodiment adjustment of the optical element is achieved with a one half-micron accuracy. Having adjusted the lateral position of the optical element appropriately, it is then incumbent upon the system to provide for a locking mechanism, which does not affect the originally aligned elements.

While in the past, locking screws and other devices have been utilized; the locking screws themselves when tightened down affected the original alignment.

In the subject invention once the optical element holder has been appropriately aligned, clamping plates to either side of the block containing the hinges are clamped together such that by clamping the plates together the original optical alignment is maintained.

The structure thus formed in essence is a single unitary structure with the positions of the individual parts maintained through friction formed by the high clamping pressure of the plates. The clamping is arranged so that there is no loading of the parts in directions that affect the alignment prior to clamping. Moreover, the material of which the clamping plates are made matches the thermal coefficient of expansion of the block so that changes in temperature affect all parts of the structure identically. The structure with the locking plates being made of the same material react identically to temperature changes, with structural rigidity of the structure resisting alignment changes in the face of dynamic and static loading. Furthermore, the relatively large area and high pressure achieved in the clamping action acts to reduce the thermal resistance from the clamping plates to the block, effectively reducing the occurrence of temperature gradients across the unit and enhancing stability.

The only elements that are not typically made from of the same material as the adjustable element are the locking screws, which because of their placement orthogonal to the direction of adjustment have little to no effect on the lateral adjustments themselves. This is because there is no resultant load in these two orthogonal directions. The locking screws, once tightened, are in a highly preloaded condition; and the change in clamping pressure experienced due a temperature change of the block and clamping plates of one material and the locking screws of another is absorbed across the area of the clamping plates, a relatively large area when compared to the locking screw head and washer.

High stress may be developed in the tiny hinge region during adjustment near the extreme ends of the adjustment range, which is usually not more than a few degrees. This high stress is not a detriment to the functioning of the unit, because the locking sandwich around the adjustable block forms a clamped, laminate structure that is very strong. Even in the case where the stress is locked in by the clamps, causing creep to occur in the hinge over time, the clamping plates so tightly grip the adjustable element that the force induced there can be ignored. This is true in part, because the tiny hinge region, where the stress is high, is very small with respect to the adjustable element. This relatively small aspect ratio of hinge area to clamped area keeps the high stress from causing high force or what would be perceived as high force by such a large clamp. Instead, the high stress is able to manifest itself as harmless creep in the hinge, until the clamp is released at some future time, if it is ever released at all. In other words, if the creep strength of the material is exceeded during adjustment the unit might exhibit a shift in adjusted position at some future date when un-clamped. This will not affect the accuracy, resolution or stability of the unit if the clamping plates are deployed and left in place.

In summary, an X, Y positioning unit, mount or fixture is designed to adjust the position of an optical element mounted in the fixture so as to move it laterally and vertically with respect to the optical axis of the element, such that, once adjusted, the position is maintained through the clamping of plates about the positioning fixture to lock the hinges against movement. In this manner the adjusted position of the optical element is locked in by high forces exerted by the plates on the fixture, with the locking technique not affecting the alignment. In one embodiment, the fixture includes live hinges which join an optical element holder to a fixed plate and pivot the holder about orthogonal axes crossing at the center of an optical element holder such that small movements of the hinged holder about the hinges adjusts the position of the center of the optical element holder and thus the optical element. The fixture in a preferred embodiment includes a milled block of metal having slots made by Electric-Discharge-Machining (EDM) or High Speed Machining (HSM), or by stacking several thin layers made by etching therein to leave thin flexible hinges, with positioning screws utilized to move the optical element holder about the hinges. When the appropriate adjustment has been made, the holder is clamped in the adjusted position to the fixed plate through the use of the clamping plates to provide a rigid structure capable of withstanding high static and dynamic loading. For laser target designator applications, positioning unit tolerance is less than one half micron, resulting in target designation boresight alignment errors less than 0.5 microradians.

BRIEF DESCRIPTION OF THE DRAWINGS

These and other features of the subject invention will be better understood in connection with the Detailed Description in conjunction with the Drawings, of which:

FIG. 1 is a diagrammatic illustration of the operation of a laser target designator illustrating the requirement of precision boresight accuracy to prevent misidentification of targets through a displaced laser beam;

FIG. 2 is a diagrammatic illustration of the laser target designator scenario of FIG. 1, illustrating the reversal of direction of the aircraft utilized in the target illumination after having designated a particular target by placing the crosshairs of the visual image on the intended illumination point;

DETAILED DESCRIPTION

Figure 3:
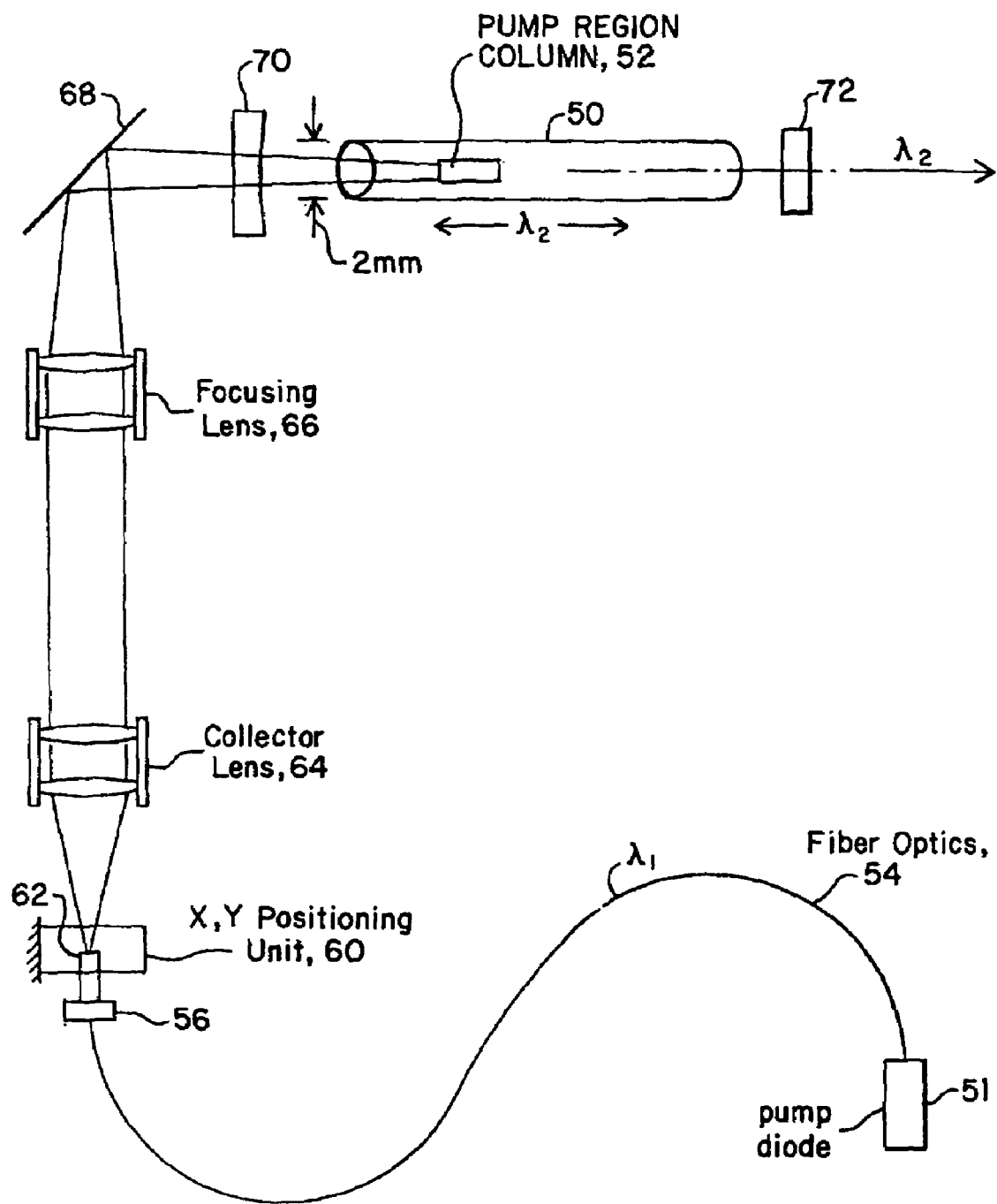
FIG. 3 is a diagrammatic illustration of a pumped laser for use in a target designation system illustrating the relatively small pump region for the laser in which a pumping diode is connected via fiber optics through the subject X, Y positioning unit so as to appropriately focus the pumped energy in the pump region.

Referring now to FIG. 1, in a tactical situation an airborne laser target designator 10 is carried by an aircraft 12 which is utilized to illuminate a target 14 which may be a particular window in a building 16 surrounded, for instance, by a stack 18 and an outlying building 21. During the laser target designator process, the aircraft, which may be standing off by as much as one mile, acquires the visual image of the target on a screen 22 having a crosshair in the center thereof. The entire optical system is maneuvered around so as to visually center the illuminated target, namely window 14 on crosshairs 24. When the crosshairs designates the intended target, a target lock system 30 is engaged to have the laser target designator lock onto the target, in this case window 14, at which point a laser beam is projected towards the target.

The laser target designator includes a visual image system 32, which has as its boresight dotted line 34. It will be appreciated that optical axis 34 of the visual image presentation system is centered on target 14.

It is the purpose of the laser target designator to provide that the output of a laser 36 having a boresight axis 38 be collinear with or matched to the visual image optical axis 34.

The degree of accuracy of the alignment of the laser beam with the visual image boresight is quite critical. From an operational point of view, the illuminated spot on the target must be within approximately three feet of the actual target. The precision by which the intended target is illuminated depends of course upon the aiming optics of the laser.

However, before considering the accuracy of the aiming optics of the laser, it is important that the laser boresight be accurately established.

This is ordinarily done by an alignment procedure in which a remotely mounted pump laser has its energy focused at a predetermined pump region within a laser rod. If the pumping radiation is not appropriately focused, for instance, to within a 0.1 millimeter region within the laser rod, then it is possible that even if there are zero pointing errors in the pointing system, a displaced laser beam 40 may result in which at a 5,000 foot standoff distance may be displaced by as much as 20 feet.

This inaccuracy can result, for instance, in the targeting of an unintended target such as an outbuilding or a smoke stack, as opposed to the intended window in the FIG. 1 scenario.

As illustrated in FIG. 2, once the laser target designator has initially locked onto the target, the aircraft typically executes an evasion maneuver which in general causes the aircraft to veer away from the target while having the laser target designator 10 illuminate the target. This evasive maneuver causes extreme dynamic loading on all aspects of the optical bench utilized in the laser target designator which if not mechanically robust can result in the aforementioned displaced laser beam.

Not only is the optical bench of the laser target designator subjected to both static and dynamic loading, temperature variations can cause optical element misalignment. It is therefore important to be able to provide an adjustable mounting system for optical elements which can survive vibration, and static and dynamic loading to preserve the original alignment of the optical elements. It is also important that whatever is utilized to lock down the alignment not have a thermal co-efficient of expansion different from that associated with the mounting apparatus itself.

One of the problems limiting the use of alignment mounts has been the difficulty in locking the alignment once it has been set. If setscrews are utilized to set the alignment, once the correct alignment has been obtained these screws are tightened to prevent any additional movement of the fixture when the system is exposed to shock and vibration environments. However, this tightening procedure is may result in altering of the original alignment if the tightening changes the alignment. Prior system have tried to balance the affect of tightening the screws but the alignment process utilizing such a tightening procedure is time consuming and difficult.

Moreover, using a lock nut and tensioning it also can affect the original desired alignment making the lock nut adjustment screw combination undesirable.

The criticality of the optical alignment in one embodiment is illustrating in FIG. 3 to show how critical the alignment of the termination of a fiber optic cable is when a pumping diode is utilized to provide energy to a rather small pump region within the laser rod.

In FIG. 3, it will be seen that a laser rod 50 has a pump region 52 which can be as small 0.1 millimeter on a side. It is important that the output of a pump diode 51 transmitted through fiber optics 54 and a terminus 56 be focused precisely on pump region 52. In order for the focusing to be exact, an X, Y positioning unit 60 is utilized to position the end 62 of the fiber optic cable precisely in two orthogonal directions.

The light from end 62 is focused by a collector lens assembly 64 which transmits collimated light to a focus lens 66 which when reflected by a mirror 68 through an end 70 of the laser cavity housing the laser rod focuses the radiation from end 62 of fiber optics 54 into the pump region. Here it will be seen that at the other end of the laser cavity is the partial reflector optic 72 which forms the output of the laser at a wavelength λ2 and thus the laser target designator. It will be appreciated that the wavelength of the pumping diode is different from λ2.

Should the output of the pumping diode not be appropriately accurately positioned in pump region 52, then there are two untoward events. First, the laser power is significantly reduced. However, more importantly, laser boresight alignment is degraded. The degradation of the boresight alignment is significant and can by itself result in a displacement of the target illuminator's spot by as much as the aforementioned 20 feet in the above example. It can be shown that the positional accuracy of the X, Y positioning unit must be less than one half micron in order that the angular boresight error of the laser target designator be less than 0.5 milliradians.

Not only must the alignment be perfect with respect of illumination of the pump region by the pumping laser, all optical elements on the optical bench for the laser target designator must be positioned to this accuracy.

While the subject invention will be described in connection with accurately positioning the terminus of a fiber optic cable, its use for positioning of any optical element is within the scope of the subject invention. Thus, for instance, optical elements such as lenses, prisms, corner reflectors, and the like may be accurately and robustly positioned through the subject X, Y positioning unit.

As will be seen through the utilization of two live hinges and a clamping sandwiching locking mechanism, the original alignment afforded through the live hinges can be preserved against high dynamic and static loading so as to preserve the one half micron alignment accuracy.

Figure 4:
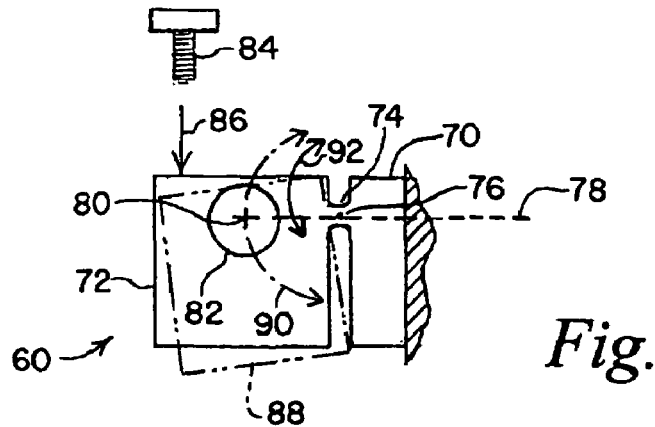
FIG. 4 is a diagrammatic and side view of the subject live hinge X, Y positioning unit illustrating a downward deflection of the hinged member through flexure of the hinge, thus to drive the center of the fiber or fiber bundle end in a controllable downward direction.

Referring to FIG. 4, the live hinge positioning fixture or mount of the subject invention is illustrated. Here positioning unit 60 is illustrated as having a mechanically fixed portion 70 connected to an adjustable movable portion 72 through flexure of a live hinge 74. The center of flexure 76 of hinge 74 is located along a horizontal axis 78 which passes through the center 80 of an optical element receiving aperture 82 in the associated holder 83.

Adjustment of the position of center 80 is accomplished through movement of portion 72 in one embodiment through the turning of a setscrew 84 such that portion 72 moves downwardly as illustrated by arrow 86 so as to come to a position illustrating by dotted line 88. It will be appreciated that center 80 moves along an arc 90 in accordance with the flexure of hinge 74. Note that portion 72 moves as indicated by double ended arrow 92.

Figure 5:
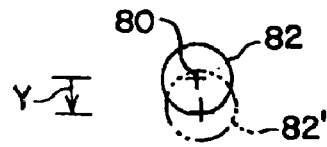
FIG. 5 is a diagrammatic illustration of the movement of the fiber or bundle end of FIG. 4 illustrating a Y axis downward correction through flexure of the live hinge of FIG. 4.

Referring to FIG. 5, it can be seen that aperture 82 moves downwardly in the Y direction as illustrated by dotted line 82' upon flexure of pivot 74 due to the action of setscrew 84. This describes the vertical translation of center point 80.

Figure 6:
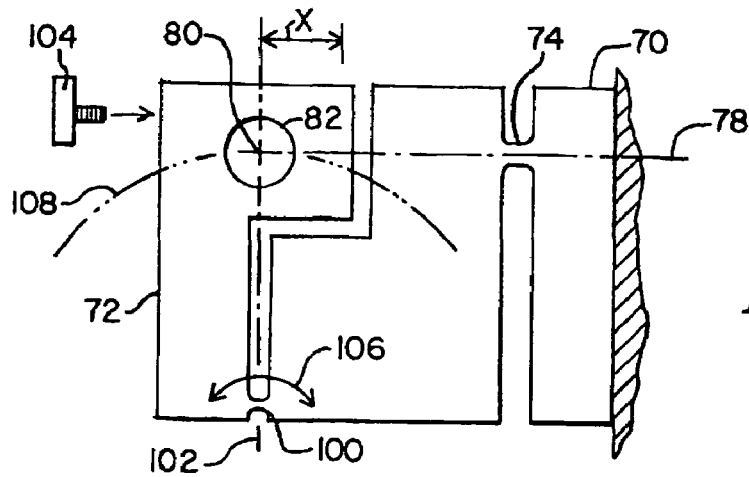
FIG. 6 is a diagrammatic illustration of the subject X, Y positioning unit illustrating the addition of a live hinge to permit adjustment of the center of the fiber/bundle end through the flexure of this additional live hinge so as to create motion in a lateral or transverse direction.

With respect to horizontal translation of center point 80 and referring now to FIG. 6, a second live hinge 100 is positioned along axis 102 which passes through center point 80 and is orthogonal to axis 78. Portion 72 is moved laterally by setscrew 104 such that portion 72 pivots about pivot point 100 as illustrated by double arrow 106 so as to go along path 108.

Figure 7:
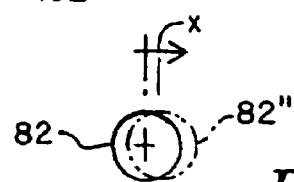
FIG. 7 is a diagrammatic illustration of the displacing of the center of the fiber/bundle end in the X direction.

Referring to FIG. 7, upon adjustment as illustrated in FIG. 6, aperture 82 is translated horizontally along the X-axis as illustrated by 82".

Having the two live hinges as illustrated in FIGS. 4 and 6, orthogonal translations of the aperture containing the optical element are easily achieved through an easy quick adjustment procedure.

Once having achieved the initial adjustment, it is important to be able to secure portions 72 and 70 so that they do not move relative to each other. What this means is that there can be no more flexure about live hinges 74 and 100 once the initial adjustment has been made.

Figure 8:
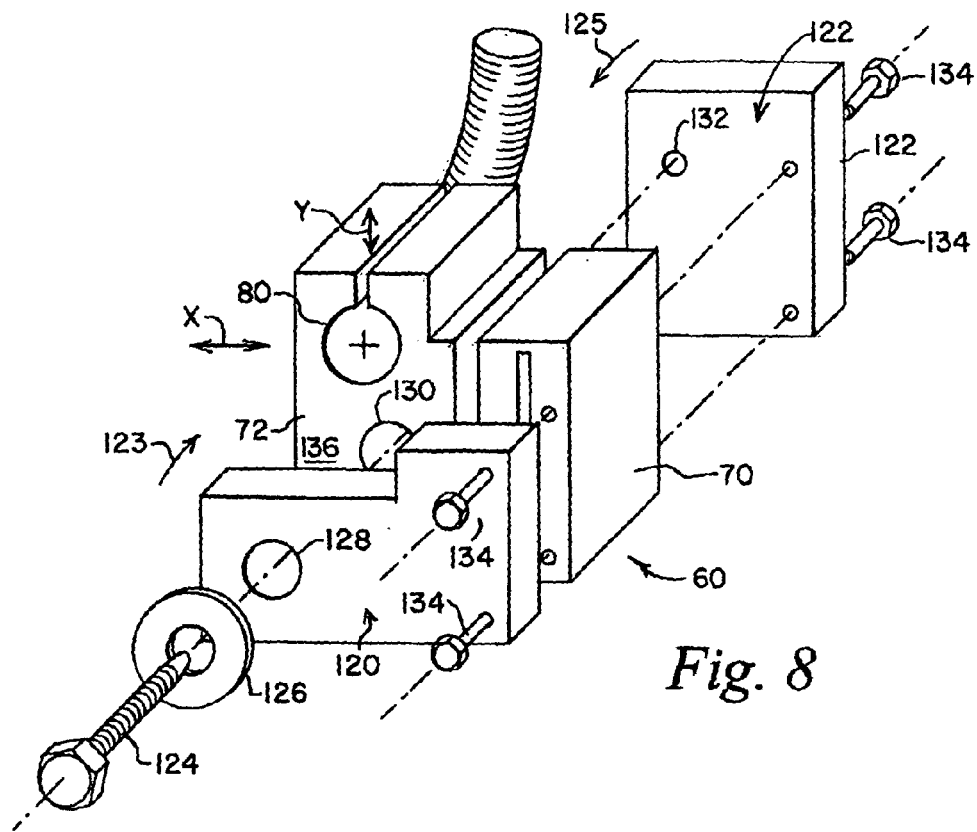
FIG. 8 is an exploded view of the subject X, Y positioning unit illustrating the utilization of clamping plates to either side of the body of the unit so as to sandwich the body therebetween, with the clamping of plates locking in the adjustments previously made.

How this is accomplished is illustrated in FIG. 8 in which the portions 70 and 72 are clamped in place through the sandwiching action of plates 120 and 122 through the use of a bolt 124 which passes through a washer 126 and an oversized aperture 128 in plate 120. The bolt then passes through another oversized aperture 130 in portion 72 of unit 60 and then to a threaded aperture 132 in plate 122.

Each of the sandwiching plates is secured at one edge through bolts 134 so that they are maintained in place and in one embodiment spaced from surface 136 of portion 72 so as to permit free motion of this portion during the adjustment process.

Once the adjustment has been made, the plates are flexed inwardly as illustrated by arrows 123 and 125 through turning bolt 124. The movement of plates 120 and 122 in a clamping position does not load portions 70 and 72 in a manner that would alter in any way the originally set position. This is because the force applied is normal to that which would be associated with flexure of either of the live hinges, the directions of adjustment.

The result is an extremely mechanically stable mounting system for optical elements which can be easily initially adjusted through the utilization of live hinges and setscrews and which position, once aligned, can be locked in through the utilization of clamping plates to either side of the device. This clamping exerts a high force that holds the adjustable element and the live hinges in place, without cross talk in the direction of adjustment.

In short, once the alignment is set, the sandwiched clamping arrangement clamps in the adjusted positions without affecting the process.

Figure 9:
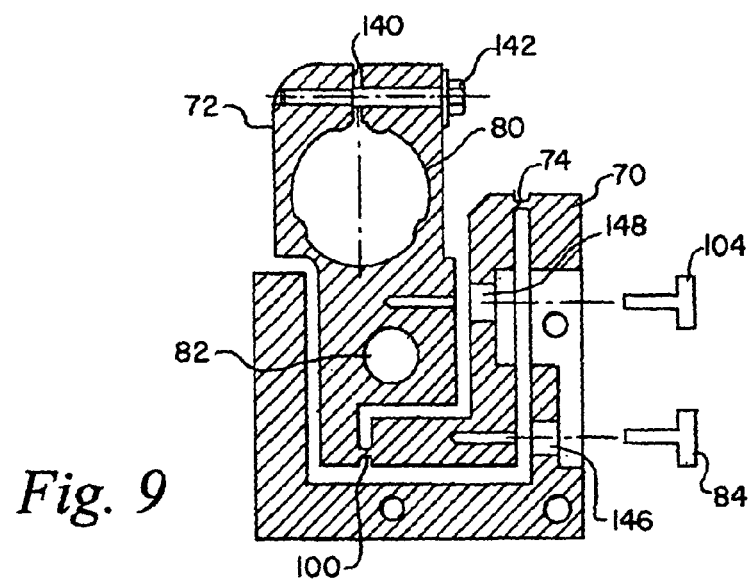
FIG. 9 is a cross sectional view of the subject X, Y positioning unit illustrating orthogonally positioned live hinges to permit vertical and lateral adjustment of the optical element holder, illustrating the alignment of the live hinges respectively on a horizontal axis on the center of the optical element holder and the vertical axis passing through the center of the optical element holder; and, FIG. 10 is a diagrammatic illustration of the utilization of the subject X, Y positioning unit to position opposing ends of a single mode fiber, illustrating the need for one half micron positioning accuracy.

Referring to FIG. 9, in one embodiment where like reference characters between FIGS. 8 and 9 indicate like elements, aperture 80 may be utilized to clamp any optical element including a lens for the positioning thereof in the X and Y directions. Here a slot 140 is formed in portion 72 to permit the clamping of the optical element in aperture 80 through the use of a bolt 142 which clamps the optical element in place. This optical element can be the terminus of a fiber optic cable, a lens, corner cube or in fact any element, the lateral position of which is to be controlled. Here live hinges are illustrated at 74 and 100. It can be seen that setscrew 84 produces the same downward motion of portion 72 as that illustrated in FIG. 4. However, setscrew 84 in FIG. 9 enters from the right through an easily accessible aperture 146. Moreover, setscrew 104 controls flexure around pivot 100 and is accessible from the right through aperture 148. This means that the two setscrews used in adjusting portion 72 are accessible from one side of the fixture or mount, thus providing easy accessibility.

Figure 10:
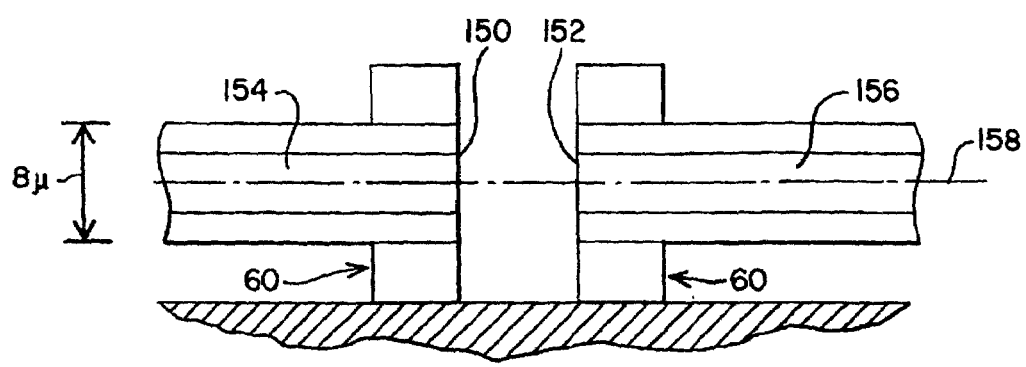

It will be appreciated that not only can optical elements be appropriately positioned by the subject X, Y positioning fixture or unit, as illustrated in FIG. 10 the ends 150 and 152 of opposed single mode fibers 154 and 156 may be adjusted so that they have a common optical axis 158. The adjustment of abutting single mode fibers is indeed critical since the diameters of the fibers themselves may be only eight microns, or less. What this means is that the position of ends 150 and 152 must be accurate to one half micron in order to sufficiently sustain the coupling between the single mode fibers.

Through the utilization of the subject X, Y positioning unit 60 at the end of each of these fibers is possible to achieve the butt-to-butt alignment of the single mode fibers, thus to support the single mode operation. Moreover, the alignment will be maintained, even in a harsh environment, including cryogenic environments, or energetic, dynamic environments.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. Ultra-stable apparatus for the positioning of an optical element for sub-micron accuracies, comprising:
    a base having a slot therein for defining a first live hinge, having side faces and including a fixed portion and a moveable portion joined by said hinge, said moveable portion including an optical element holder having a center;
    an adjustment unit for moving said moveable portion to an adjusted position, thus to flex said hinge;
    clamping plates on diametrically opposite sides of said first live hinge so as to contact the side faces thereof to sandwich said first live hinge therebetween, said plates when clamped together adapted to engage said first live hinges at said side faces to prevent flexure of said live hinge; and,
    an actuator for clamping said plates together after achieving said adjusted position, thus to lock in said adjusted position, whereby clamping said plates preserves said adjusted position to said sub-micron accuracy without altering said adjusted position during the locking procedure.

2. The apparatus of claim 1, wherein said live hinge lies on an axis through the center of said optical element holder.

3. The apparatus of claim 2, wherein said optical element has an optical axis and wherein said live hinge axis is orthogonal to said optical axis.

4. The apparatus of claim 1, wherein said moveable portion has a slot therein defining a second live hinge for permitting motion of said moving portion in a direction orthogonal to that associated with said first-live hinge, thus to permit adjustment of the position of said optical element holder in orthogonal directions and further including a second adjustment unit for moving said moveable portion in a direction orthogonal to the direction associated with flexure of said first-live hinge, thus to provide adjustment of the position of said optical element holder in two orthogonal directions.

5. The apparatus of claim 4, wherein said second live hinge is centered on a second live hinge line running through the center of said holder and orthogonal to a first live hinge line about which said first live hinge flexes, said first live hinge line running through the center of said holder.

6. The apparatus of claim 1, wherein said adjustment unit includes a screw having a tip.

7. The apparatus of claim 4, wherein said adjustment units are accessible from one side of said base.

8. The apparatus of claim 7, wherein said adjustment units are located in said fixed portion of said base.

9. The apparatus of claim 1, wherein said plates are initially spaced from said diametrically opposite side to permit adjustment of said moveable position of said base prior to clamping, thus to facilitate unfettered adjustment of the position of said optical element holder.

10. A method for preserving sub-micron alignment of an optical element in an adjustable optical element position holder secured to a base having opposed sides comprising:
    clamping plates to diametrically opposite sides of said base so as to contact the adjustable optical element position holder to maintain said holder in the position established before clamping, thus to eliminate the necessity of providing locking apparatus which affects the originally established holder position, the position of the holder being established through the use of at least one live hinge, the clamping plates freezing the position of the hinge.

11. A method of robustly aligning opposed single mode optical fibers to a sub-micron accuracy and locking the apparatus after adjustment without disturbing the alignment, comprising the steps of:
    locating each of the ends of the fibers in an X, Y positioning fixture adjustable to a sub-micron accuracy; and,
    adjusting the position of the ends of the fibers to lie along a common optical axis using the X, Y positioning fixture, said positioning fixture including a block with at least one live hinge that provides adjustability of a movable portion of the block in X, Y orthogonal directions, the movable portion including a holder for the end of an optical fiber;
    and further including the step of locking the hinge in place after adjustment using opposed locking plates drawn together on opposite sides of the live hinge to clamp the live hinge side faces in place so as not to disturb the adjustment by the locking.

* * * * *